Oct. 4, 1938.    A. A. VAN PELT    2,132,249
OIL LUBRICATED MOUNTING
Filed Dec. 23, 1937    2 Sheets-Sheet 1
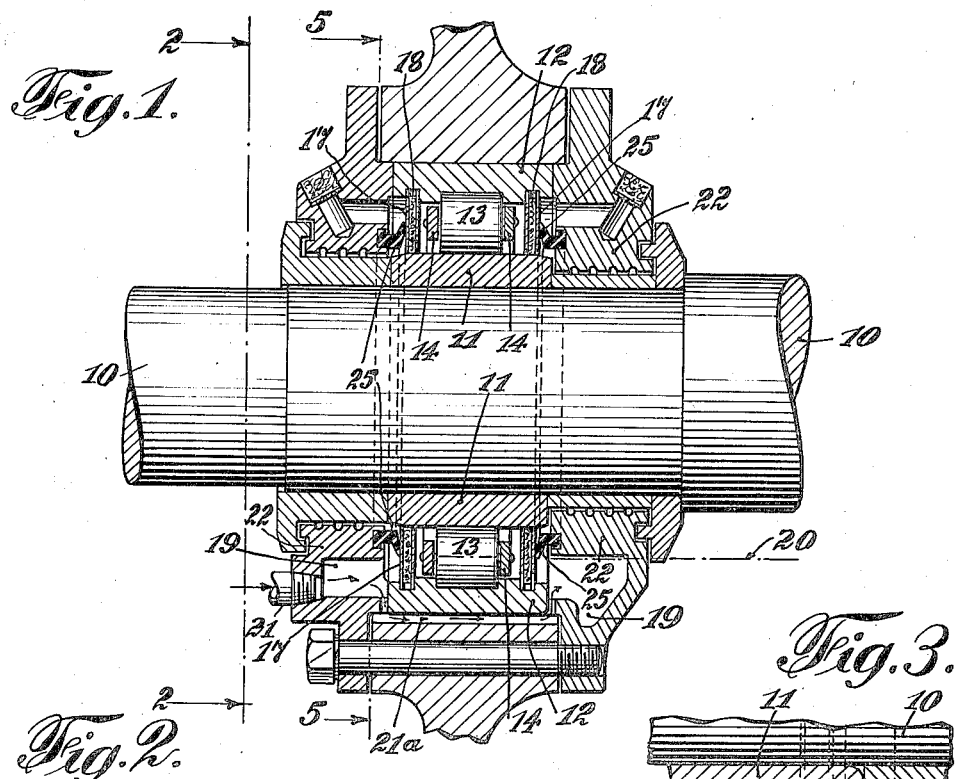
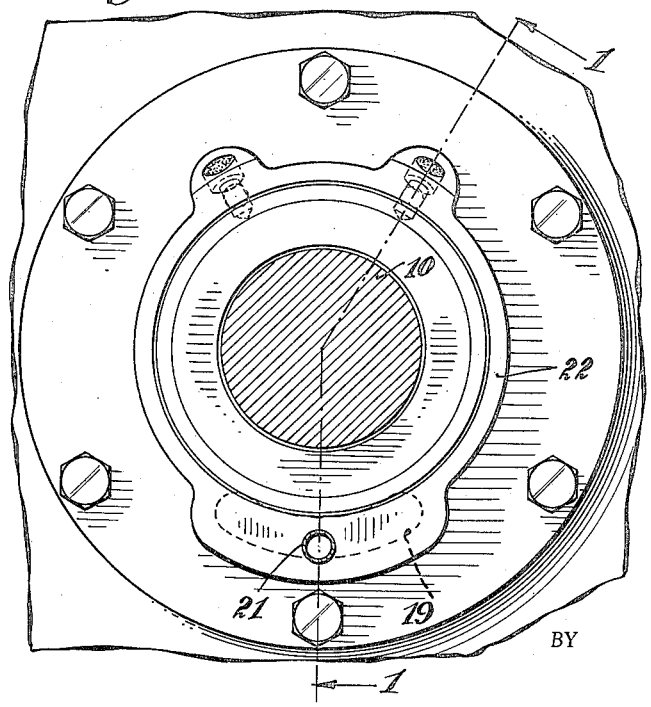
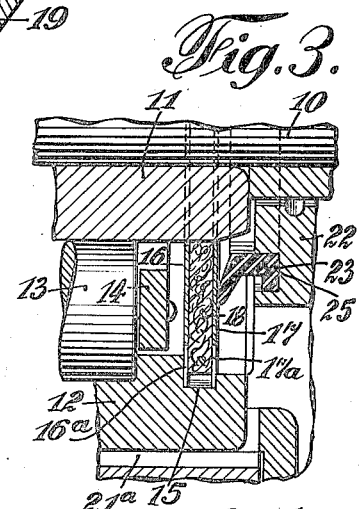
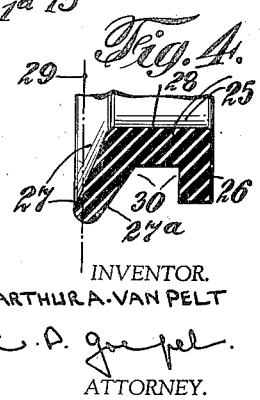
INVENTOR.
ARTHUR A. VAN PELT
ATTORNEY.

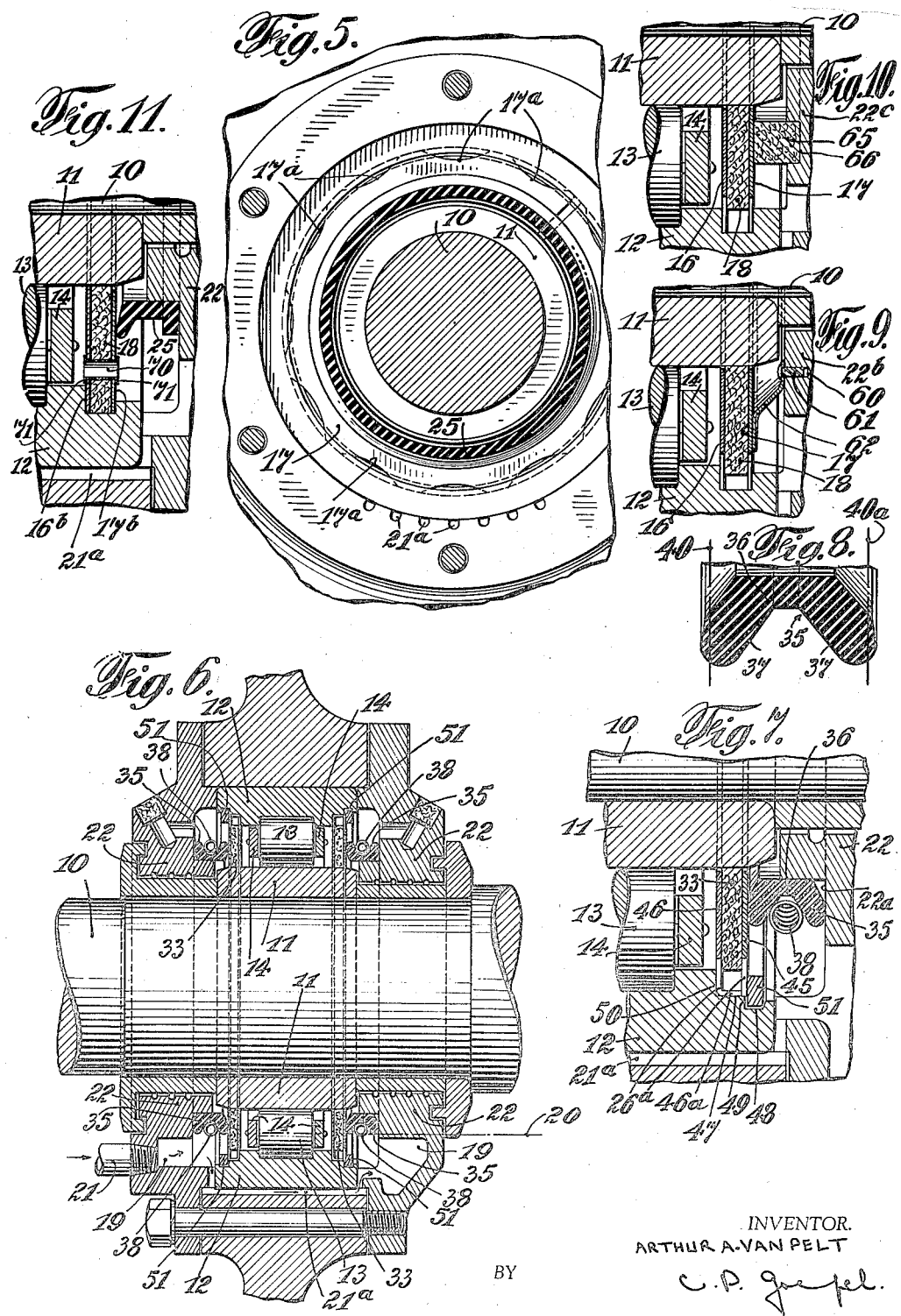

Patented Oct. 4, 1938

2,132,249

UNITED STATES PATENT OFFICE 2,132,249

OIL LUBRICATED MOUNTING

Arthur A. Van Pelt, Pittsburgh, Pa., assignor to Norma-Hoffmann Bearings Corporation, Stamford, Conn., a corporation of New York Application December 23, 1937, Serial No. 181,378

4 Claims. (Cl. 308—187)

This invention relates to oil lubricated mountings, and more particularly the invention has for its object to provide means for confining the lubricating medium in predetermined localities with mountings of traction motors, or apparatus subjected to movement or vibration, and the like.

It has already been proposed to provide means for supplying lubricant to bearings used in stationery motors, such means consisting essentially of seals having openings for the passage of the lubricant. While such means are also utilized in the embodiments of the present invention, no claim is made thereto in this application.

What is particularly set forth herein and claimed as new is the means correlated with parts of the mounting to prevent splashing of the lubricant in moving mountings, and for this purpose the invention consists of yieldable means disposed between the bearing seal and the mounting to prevent splashing of the lubricant from the lubricant reservoir upwardly and escape along the shaft of the mounting. The provision of such a confining member serves to maintain the lubricant in its reservoir, to enable it to do the work for which it was intended, without unnecessary losses.

The invention will be further described hereinafter, embodiments thereof shown in the drawings, and the invention will be finally pointed out in the claims.

In the accompanying drawings,

Figure 1 is a vertical central section of a mounting provided with a sealing device, and with my improved confining member; said section being taken on line 1—1 of Figure 2;

Figure 2 is an end view of Figure 1 seen from line 2—2 of Figure 1;

Figure 3 is an enlarged partial sectional view of Figure 1;

Figure 4 is a still further enlarged sectional view of the improved confining member;

Figure 5 is a section taken on line 5—5 of Figure 1;

Figure 6 is a vertical central section of a mounting in which an alternative form of the improved confining member is applied;

Figure 7 is an enlarged sectional view of parts of Figure 6;

Figure 8 is a still further enlarged sectional view of the improved confining member;

Figure 9 is a detail view of another embodiment of the invention, in which a metallic spring acts as a barrier;

Figure 10 is a similar view of another embodiment in which a lateral washer of cork or the like acts as a barrier; and Figure 11 is a detail view of a modified form of seal, in which an oil inlet tube is provided, this tube being located at the lowermost position of the bearing. The oil inlet tube takes the place of the cutouts in the peripheral portions of the washers as shown in Figure 5.

Similar characters of reference indicate corresponding parts throughout the various views.

Referring to the drawings, and more particularly to Figures 1 to 5, the shaft 10 has an inner race ring 11 secured thereto, between which an outer race ring 12, rollers 13 are disposed, which are held in spaced relationship by a cage 14. The outer race ring has a groove 15 circumferentially disposed, to hold split washers 16 and 17, each having peripheral openings 16a and 17a, to permit the passage of lubricant. Disposed between the two split washers 16 and 17, is a layer 18 of felt or other suitable material, which does not contact with the surface of the groove but does contact with the inner race ring, where it extends beyond the inner peripheral margins of the split washers 16 and 17. A reservoir 19 is provided which is so arranged that its oil level indicated by the line 20 extends about in alignment with the axis of the rolling element which is lowermost, that is, as shown in Figure 1. This reservoir is supplied with lubricant to the indicated level by a conduit 21, a channel 21a acting as a communication means between those parts of the reservoir at either side of the bearing.

No claim is made herein for the parts per se, just described.

To prevent a splashing upwardly of the lubricant from the level line 20, in the case of traction motors, or the like, which are subjected to shocks and jars in passing over the roads, a confining member 25 is provided. This member 25 is made of artificial rubber. In the embodiment shown in Figures 1, 3 and 4, this member consists of a web portion 28 having two legs 26 and 27, the leg 26 having an external configuration to fit into a recess 23 in the part 22 of the mounting. This leg 26 may be made slightly larger than the recess cavity, so that on expansion a tight fit is obtained such as to anchor the leg 26 in the recess 23. Additional securing means, as cement, may be provided, the essential feature here being to anchor one part of the confining member 25 securely to the mounting parts. The other leg 27 of the member 25 is made somewhat longer than the leg 26, and diverges from the web member 28. The line 29 in Figure 4 indicates the plane of the outer face of the washer 17 against which the leg is pressed, the relationship between the leg 27 and the line 29 being shown in Figure 4 to show the general extent of compression to which this leg 27 is subjected, to indicate the degree of inherent resiliency always tending to press the leg 27 against the outside washer of the seal. It is seen from Figures 1 and 3 that the member 25 acts as a solid bridge from the part 22 to the outside washer, and thus prevents any lubricant from passing up against the shaft 10 and along the same. As is clearly seen, the lubricant of the reservoir 19 in Figure 1 is retained therein, subject only to such necessary deductions needed to lubricate the bearings. Any lubricant splashed upwardly between the seal and mounting will be caught by the member 25, due to its cup-shaped groove 30, and will preferably glide along the inclined wall 27a of the leg 27 and drop therefrom back into the reservoir 19. The member 25 is a ring extending circumferentially around the outer washer of the seal. One part of the seal and member 25 has been described in connection with Figures 3 and 4. It is clear that the same description applies equally to the member 25 disposed at the outer side of the other seal. In the embodiment shown in Figure 1, two seals are shown, and in consequence two confining members 25 are shown in co-relationship therewith, as described.

In Figures 6 to 8, another embodiment of confining member is shown. To accommodate the same, the part 22 of the mounting is cut away as indicated by the cut-out 22a. A two legged member 35 of artificial rubber has a web member 36 with two substantially equally shaped legs 37 extending therefrom. The outer surface of the web 36 is flat and seats itself circumferentially around the flat seat of the cut-out 22a. A garter-like spring member 38 seats itself in the groove of the member 35 between the two legs 37, and serves to press the ring member 35 against the land of the cut-out 22a and also to spread laterally the two legs 37, one leg against the other part of the cut-out, and one leg against the outer surface of the washer of the seal. The initial conformation of the ring member 35 is shown in Figure 8, and the lines 40 and 40a show the planes of the surfaces against which the legs press when the ring is applied in the mounting. The compression thus exerted upon the ring causes the inherent resiliency of the confining member to press the ends of the legs laterally outwardly so as to insure tight sealing action and prevent any lubricant from passing between the legs and the surface upon which such legs exert their pressure. In the embodiment shown in Figure 7, the leg intended to press against the washer presses against a washer of special construction, which washer is indicated by 45. The washers 45 and 46 differ in construction from those shown in Figures 1 to 3, and this form of construction is not old, as admitted in respect to the washers shown in Figures 1 to 3. The washer 46 has an angular seating flange 46a. The washer 45 does not have a flange. Instead of the groove 15 of Figure 3, two lands of different diameter are provided, indicated by 47 and 48. A shoulder 49 is formed between these lands 47 and 48. A shoulder 50 is also provided. A ring 51 to lock the washers exerts radially outward pressure on the land 48, and is engaged against the washer 45. The flange 46a seats against the land 47 and against the shoulder 50. The usual felt layer 33 or some other material which will admit oil but which will confine the agitation of the oil within the bearing itself and not allow the oil vapor to escape from the bearing when in rotation, is disposed between the washers. The washers also have peripheral cut-outs 26a like those indicated by 17a in Figure 5.

The confining member is preferably artificial rubber, of a composition which will not be influenced deleteriously by the lubricant, said rubber composition being suitably molded to the desired configuration and so as to enable it to exert sidewise pressure by its own inherent resiliency both against the seal and against correlated parts of the housing or mounting. Such rubber rings may be variously shaped, several forms being shown in the disclosed embodiments, as these are the best forms so far devised, but other forms will present themselves to one skilled in the art, within the teachings of this invention.

In Figure 9 is shown a detail view, in which the roller, races and cage are partially shown, and in which the housing wall 22b is provided with a bore 60 engaged by a screw 61, which supports a metallic ogee curved spring member 62, the free end of which abuts against the outer washer 17. This spring member is in the form of a ring so as to circumferentially contact with the washer, and act as a barrier, in the same manner as the rubber confining member 25.

In Figure 10 a similar view is shown. In this embodiment a felt or cork ring 65 is supported in a groove 66 of the housing 22c, and the ring 65 presses slightly against the washer 17, to seal the contact.

In Figure 11, the two washers 16b and 17b and the material therebetween are provided with registering holes. Into these holes, a tube 70 is inserted, preferably both ends of the tubes being upset as at 71. This oil inlet tube enables oil to pass through. It takes the place of the peripheral cut-outs 16a of Figure 5. The tube is at the lowermost position of the bearing. This oil inlet tube allows the oil to enter the bearing, and at the same time, it confines the agitation of the oil within the bearing and retains the oil vapor within the bearing.

The mountings shown in the drawings have constituent parts well known to one skilled in the art, and as they form no part of the invention except as environment to the invention, they are not described in detail.

Instead of rollers, other forms of antifriction members, as balls or needles, may be used.

It is obvious that various changes and modifications may be made in the details of construction and design of the above specifically described embodiments of this invention without departing from the spirit thereof, such changes and modifications being restricted only by the scope of the following claims:

What is claimed is:

1. In a mounting having a housing, a shaft, an inner race ring, an outer race ring, antifriction members therebetween, a lubricant reservoir, at the lower part of said race rings, sealing members extending from one race ring to the other to enclose the space therebetween, the combination therewith of a lubricant confining member disposed between the seal and the housing for preventing lubricant from passing from the reservoir to the shaft.

2. In a mounting having a housing, a shaft, an inner race ring, an outer race ring, antifriction members therebetween, a lubricant reservoir, at the lower part of said race rings, sealing members extending from one race ring to the other to enclose the space therebetwen the combination therewith of a lubricant confining member disposed between the seal and the housing for preventing lubricant from passing from the reservoir to the shaft, said confining member comprising a web member and legs laterally thereof, one leg being against the housing and the other leg against the seal, under the inherent resiliency of the material from which the member was made.

3. In a mounting having a housing, a shaft, an inner race ring, an outer race ring, antifriction members therebetween, a lubricant reservoir, at the lower part of said race rings, sealing members extending from one race ring to the other to enclose the space therebetween the combination therewith of a lubricant confining member disposed between the seal and the housing for preventing lubricant from passing from the reservoir to the shaft, said confining member comprising a web member and legs laterally thereof, one leg being against the housing and the other leg against the seal, under the inherent resiliency of the material from which the member was made, and a garter-like ring pressing upon the web member to hold it in position.

4. In a mounting having a housing, a shaft, an inner race ring, an outer race ring, antifriction members therebetween, a lubricant reservoir, at the lower part of said race rings, sealing members extending from one race ring to the other to enclose the space therebetween, the combination therewith of a lubricant confining member disposed between the seal and the housing for preventing lubricant from passing from the reservoir to the shaft, said sealing members including two rings having registering holes, a felt washer therebetween and a tubular member passing through the registering openings and supported by said rings.

ARTHUR A. VAN PELT.